United States Patent [19]

Bouricet

[11] Patent Number: 5,540,546
[45] Date of Patent: Jul. 30, 1996

[54] RADIAL SLOT IN A TURBO-MACHINE

[75] Inventor: Jean C. Bouricet, Annecy-le Vieux, France

[73] Assignee: KSB Aktiengesellschaft, Frankenthal, Germany

[21] Appl. No.: 233,041

[22] Filed: Apr. 25, 1994

[30] Foreign Application Priority Data

Apr. 24, 1993 [DE] Germany ............... 43 13 455.6

[51] Int. Cl.$^6$ ..................................... F01D 3/04
[52] U.S. Cl. ................ 415/104; 415/106; 415/112
[58] Field of Search ........................ 415/104, 105, 415/106, 112

[56] References Cited

U.S. PATENT DOCUMENTS

| 1,146,079 | 7/1915 | Krogh . | |
|---|---|---|---|
| 3,180,568 | 4/1965 | Oettle | 415/112 |
| 3,671,137 | 6/1972 | Ball | 415/104 |
| 4,475,866 | 10/1984 | Kambe et al. | 415/112 |
| 4,541,773 | 9/1985 | Drevet . | |
| 4,684,318 | 8/1987 | Mulders . | |
| 5,104,284 | 4/1992 | Hustak, Jr. et al. | 415/105 |
| 5,161,943 | 11/1992 | Maier . | |

FOREIGN PATENT DOCUMENTS

| 0042345 | 10/1983 | European Pat. Off. . | |
|---|---|---|---|
| 0574739 | 7/1924 | France | 415/112 |
| 2602834 | 2/1988 | France | 415/112 |
| 1453787 | 5/1969 | Germany | 415/104 |
| 2520653 | 6/1979 | Germany . | |
| 3010406 | 9/1980 | Germany . | |
| 3011380A1 | 10/1981 | Germany . | |
| 3036690 | 5/1982 | Germany | 415/112 |
| 0224764 | 11/1986 | Germany . | |
| 1099125 | 6/1984 | U.S.S.R. | 415/105 |
| 0377370 | 7/1932 | United Kingdom | 415/106 |
| PCT WO86/ 04970 | 2/1986 | WIPO . | |

OTHER PUBLICATIONS

Europump, Mar. 16, 1970.
VDI Berichte 706, Nov. 9, 1988.

Primary Examiner—Edward K. Look
Assistant Examiner—Mark Sgantzos
Attorney, Agent, or Firm—Darby & Darby, P.C.

[57] ABSTRACT

An apparatus comprises a rotatable shaft. A bush has a circumference with the bush being disposed about the shaft. The bush has a plurality of openings disposed throughout the circumference. Each of the plurality of openings is spaced from the remaining openings. A slot, having a first end and a second end, is disposed between the shaft and the bush. The first end is exposed to fluid having a first pressure. The second end is exposed to fluid having a second pressure which is less than the first pressure. The plurality of openings is exposed to fluid having a third pressure which is less than the first pressure and greater than the second pressure such that fluid flowing from the plurality of openings into the slot exits exclusively from the second end of the slot.

12 Claims, 3 Drawing Sheets

RADIAL SLOT IN A TURBO-MACHINE

FIELD OF THE INVENTION

The present invention relates to a radial slot, for example in a turbo-machine, disposed between a rotating first part and a second part. More specifically, the present invention relates to a radial slot disposed between a rotating shaft and a bush, whose ends are exposed to a pressure gradient in a surrounding fluid and which consequently has a high-pressure side and a low-pressure side. The bush has mutually independent openings disposed over its circumference, through which a fluid under high pressure flows into the slot to improve the quiet running of the rotating part.

BACKGROUND OF THE INVENTION

The use of radial slots, traversed in one direction, for diaphragm glands with smooth slots, step slots, or labyrinth slots is generally known. All slots of this type are subject to the same circumstances. A pressure difference in the fluid at the end of the slot causes an axial flow through the slot, which depends on the slot width. Because the first structural part is rotating, a rotational flow is superposed on the axial flow through the slot. Since the slot, which has fluid flowing through it acts as a throttle slot, in which the pressure of the fluid is reduced, the slot is subject to powerful hydraulic influences. These influences make the slot a source of instabilities for the shaft, and especially for vibrations in the radial direction, which impair the quiet running of the shaft. Therefore, to prevent the troublesome instabilities, especially vibrations, bearings are typically placed as close as possible to the slot.

A radial slot, traversed in the axial direction, is also used in connection with axial-thrust balancing devices of turbo-machines, to control the axial thrust. These balancing devices can consist of a dummy piston guided in a bush (see Europump, Technical Vocabulary, Part 2.1, Components of Centrifugal Pumps, FIGS. 11c, 12). Balancing devices consisting of a combination of a dummy piston and a relief disk are also known (see Europump, Part 2.1, FIG. 29b). A disadvantage here is that the part of the balancing device, which is connected to the shaft, increases the mass of the shaft, thus further impairing the quiet running of the balancing device.

To eliminate this disadvantage, it is known from the EP-B 0 224 764 that the bush of a balancing device can be equipped with channels. The flow conducted through the channels to the slot divides into two flow directions: into a back-flow into the space on the rotor side, as a reverse current, and into the actual load-relief flow from the channels to the low-pressure side. The reverse current is designed to achieve a load-relief flow that is free of preliminary rotation. Just by reducing the rotation in the slot, this reduces the tendency of the pump rotor to proper vibrations in the limit-load region. However, as a result of this design, the balancing device becomes even longer and its mass becomes even greater than that of known balancing devices.

SUMMARY OF THE INVENTION

It is an object of the present invention to reduce the instabilities caused by a slot traversed by fluid and to increase the quiet running of a rotating part.

According to the present invention, the openings are disposed such that the stream conducted through the openings adds, as a stabilization current, to a slot current which flows from the high-pressure side to the low-pressure side, and the pressure in the stabilization current is chosen so that both streams exit from the slot exclusively on the low-pressure side.

The present invention produces a local pressure rise in the slot at the location of its junction. This stabilizes the shaft and reduces vibrations. The shaft is also held in a central position by simple means.

According to a further development of the present invention, the axial-thrust balancing device has the advantage that the device itself is an element to improve the quiet running and to stabilize a shaft which is exposed to other influences. The improvement of running quiet makes it possible to increase the power of the turbo-machine despite the increased mass of the rotating parts.

To prevent a preliminary rotation in the stabilization flow, the flow consists of fluid that has been branched off outside the rotor-side space, in a region where the pressure is higher than that in the slot, at the point where the channels terminate.

In a preferred embodiment, the openings terminate in the central region of the slot. The openings can be radial holes so that they are easy to manufacture.

The stabilization flow can be branched off very simply from the pressure housing or from the pressure connection-piece.

Further modifications provide for disposing the openings in one or more planes. Depending on the length of the slot, the stabilization effect can be reinforced by several opening planes.

The inventive axial-thrust balancing device can be advantageously used in high-pressure centrifugal pumps.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PRESENT INVENTION

Figure 1:
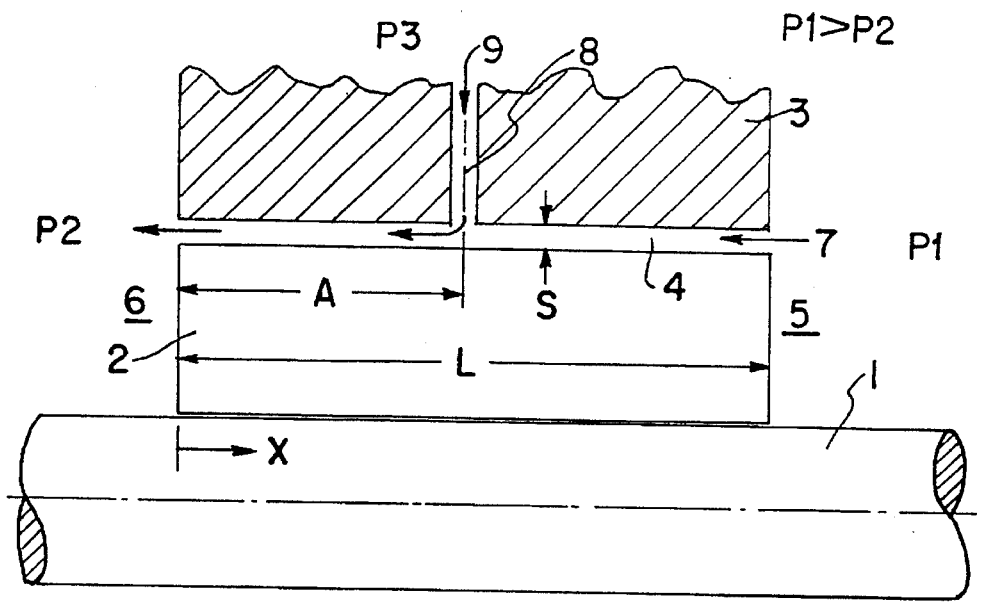
FIG. 1 shows a longitudinal sectional view of a slot of an axial-thrust balancing device.

Referring now to FIG. 1, a load relief element in the form of a dummy piston 2, disposed on a shaft 1 of a rotor, is axially fixed and is non-rotatably connected to the rotor. The dummy piston 2 rotates in a bush 3. A slot 4, having a length L and a slot-width S is disposed between piston 2 and bush 3. Fluid flows through this slot 4 from one end at a high pressure $P_1$, called the high-pressure side 5, to another end of low pressure $P_2$, called the low-pressure side 6. The arrow 7 on the high-pressure side 5 indicates a non-rotatable, purely axial flow through the slot 4. However, because of the rotation of the shaft 1, this flow actually has a component in the circumferential direction. In the case of centrifugal pumps, the flow 7 is generally from the rotor-side space, such as the high-pressure side 5, to the pump-inlet space, such as the low pressure side 6, to relieve the pressure.

The bush 3 has several openings, distributed over its circumference, of which one opening 8 is shown in FIG. 1. The openings are disposed in a plane perpendicular to the center axis of the shaft and are independent of one another. The opening 8 terminates in a slot 4 at an axial distance A from the low-pressure side 6. A stabilization current of flow 9, subject to pressure $P_3$, flows through the opening 8 into slot 4. The stabilization current 9 does indeed divide into various directions within the slot 4, but, because $P_1>P_3>P_2$, it is kept in such a way that it is unable to exit on the high-pressure side 5. Thus, there is no back-flow to the high-pressure side 5. Rather, the stabilization current 9 is added to the flow 7, so that the fluid exits exclusively on the low-pressure side 6.

Figure 2:
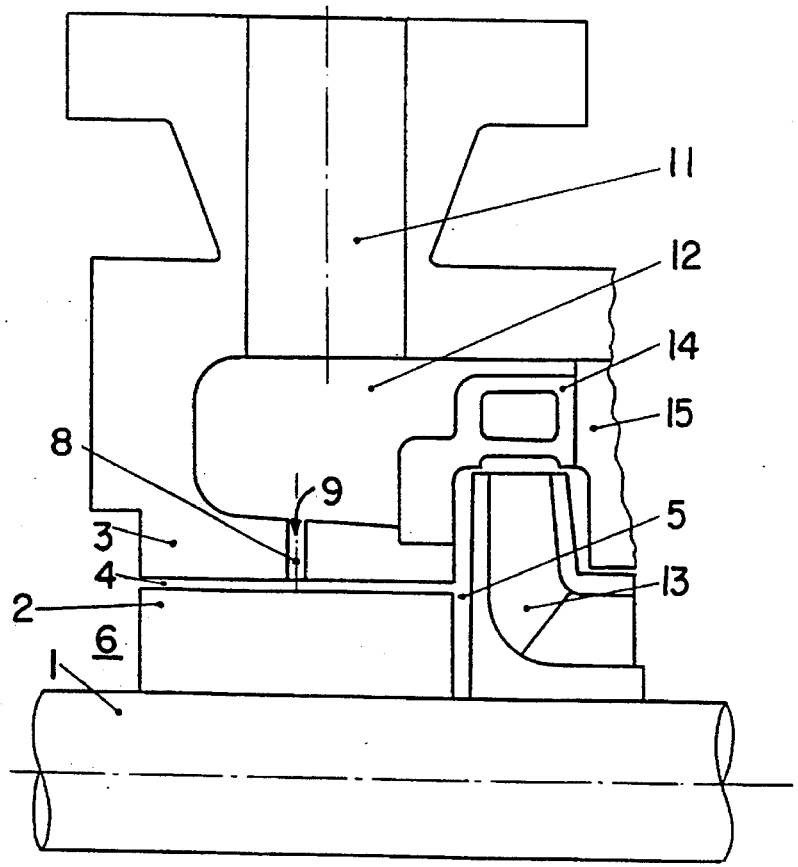
FIG. 2 shows a multiple-stage centrifugal pump with a stabilization device.

FIG. 2 shows the arrangement of a balancing device in a multi-stage centrifugal pump or turbo-machine. The dummy piston 2 is disposed to the side of the rotor 13 and the guiding device 14. The centrifugal pump has several stage-housings 15. The stabilization flow 9 is withdrawn outside the rotor-side space in the pressure region, e.g., directly from a pressure connection piece 11 of the turbo-machine or a preceding pressure-housing 12.

Figure 3:
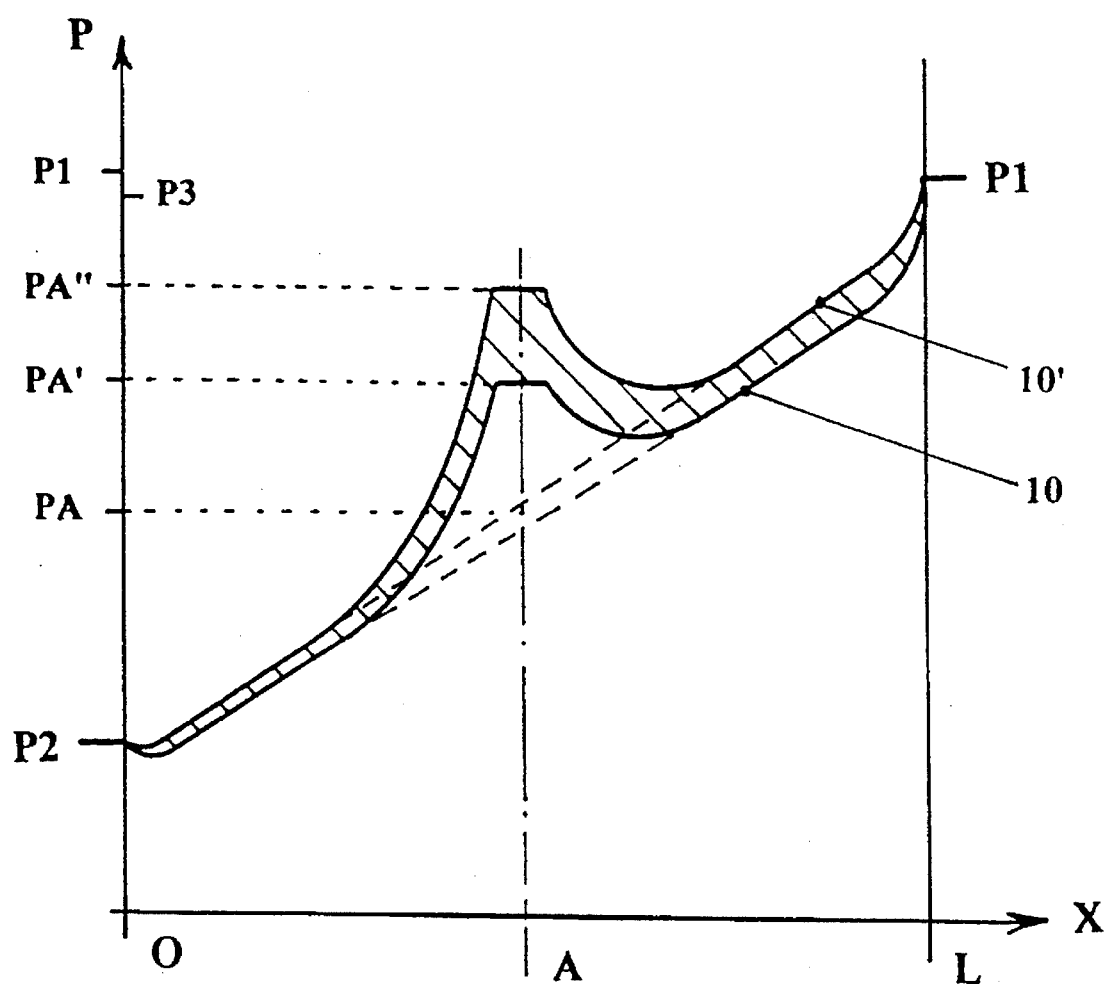
FIG. 3 shows a qualitatively approximate pressure pattern in the slot.

FIG. 3 shows, in a greatly simplified manner, a qualitatively approximate pressure pattern in the slot 4 along an axis X. At X=0, a pressure $P_2$ prevails in the slot 4, that is the pressure of the low-pressure side 6. At X=L, a pressure $P_1$ prevails in the slot 4, that is the pressure of the high-pressure side 5. The assumption of linear throttling in the slot 4 yields the straight pressure line 10 through the points (L/$P_1$) and (0/$P_2$). Without the present invention, a pressure PA would be expected at the point X=A. However, the stabilization current 9, which flows in through the opening 8 at a pressure $P_3$, increases the pressure to PA' which is greater than PA at the point X=A The pressure $P_3$ is reduced in all directions and falls toward the straight pressure line 10.

If the shaft 1 were to leave its centered position, the slot width is thus reduced on one side from S to S', and the pressure PA' will then rise to PA" on that side The straight pressure line 10 would also change with the changing slot width, such that the pressure rises as the slot constricts, and a straight pressure line 10' results. However, since the slot width increases on the opposite side, the pressure falls below PA' there. A reset force is then generated, which can be derived from the cross-hatched area so as to return the shaft 1 to its central position.

Figure 4:
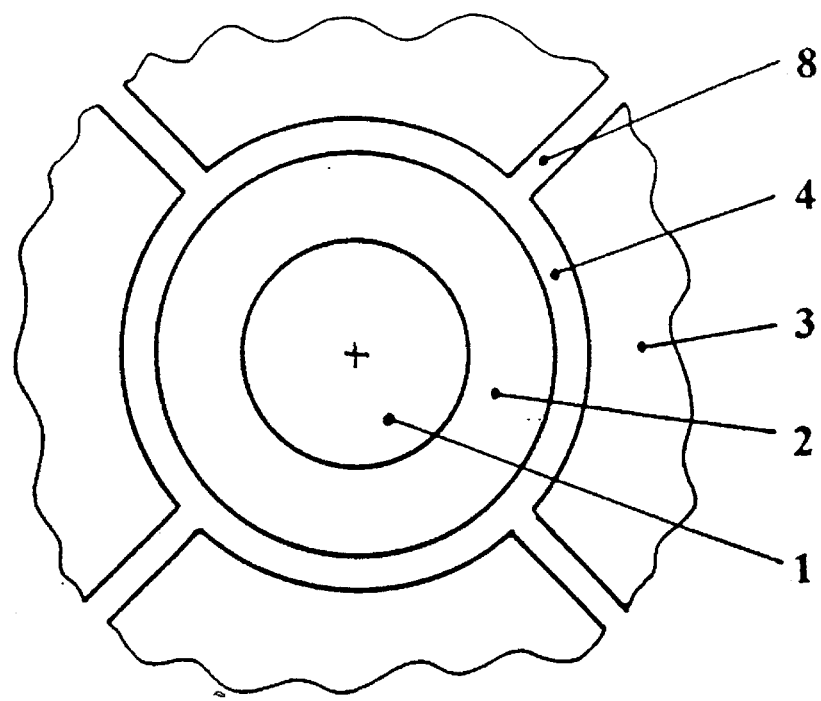
FIG. 4 shows a cross-section through the stabilization device in the area of the openings.

As shown in FIG. 4, the openings 8 of the bush 3 lie in one plane and terminate in the slot 4 independently of one another.

Figure 5:
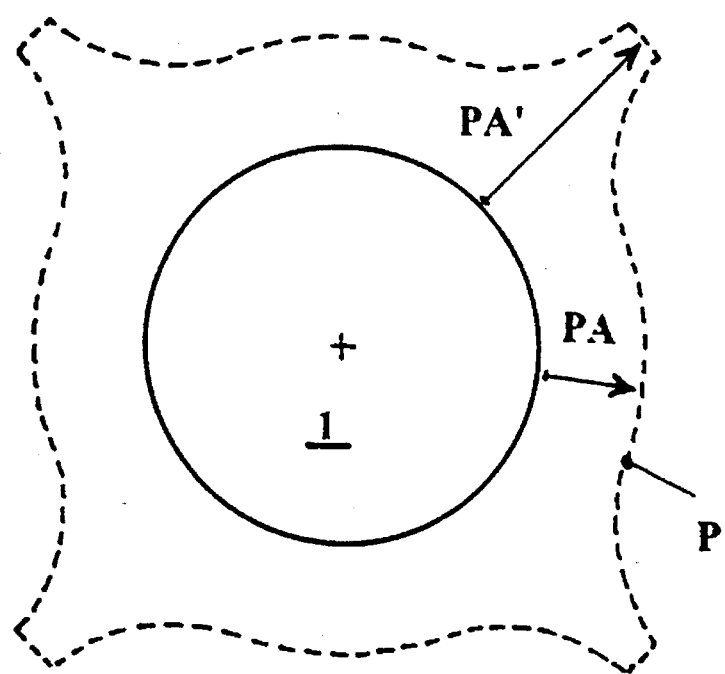
FIG. 5 shows the pressure distribution over the circumference of the slot.

FIG. 5 shows the pressure distribution of a shaft 1 disposed in its central position. Except for the region of the openings 8, the pressure PA prevails over the circumference of the slot 4. In the region of the openings, the pressure PA is increased to the pressure PA'. However, the PA' is less than the pressure $P_3$ in the stabilization current 7. Thus, the regions with a pressure PA' which corresponds to the standard throttle slot, lie between the local pressure elevations, so that the stabilization current 9 produces no blocking effect for the flow 7 through the slot 4.

It is also possible to equip the slot with several opening planes distributed over its axial length. In this variation of the present invention, it is preferred to have different pressures for the various opening planes.

The present invention has been described in terms of an axial-thrust balancing device in a centrifugal pump. The pump preferably being disposed at a transport height of 200 m. But in principle, the conditions described here occur in every throttle slot, in which one part rotates inside another. Accordingly, the present invention can also be used for turbo-machines.

From the foregoing description, it will be appreciated that the present invention makes available, a compact, cost efficient slot disposed between a bush and a rotating shaft. Having described the presently preferred exemplary embodiment of a new and improved slot disposed between a bush and a shaft in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

What is claim is:

1. An apparatus comprising:

a rotatable shaft;

a bush having a circumference, said bush being disposed about said shaft, said bush having a plurality of openings disposed throughout said circumference, each of said plurality of openings being spaced from the remaining openings;

a slot, having a first end and a second end, being disposed between said shaft and said bush, said first end being exposed to fluid having a first pressure, said second end being exposed to fluid having a second pressure which is less than said first pressure;

wherein said plurality of openings being exposed to fluid having a third pressure which is less than said first pressure and greater than said second pressure such that fluid flowing from said plurality of openings into said slot exits exclusively from said second end of said slot.

2. The apparatus according to claim 1, wherein said shaft comprises a load-relief element rotating with said shaft and having at least one section in the form of a piston, said bush being non-rotatable, wherein a flow from the first end is adjacent to a rotor, as a high-pressure region, through the slot into the second end that is adjacent to a pump-inlet as a low-pressure region.

3. The apparatus according to claim 2, wherein the flow from the plurality of openings is branched off outside the rotor-side space from a region whose pressure is elevated relative to an uninfluenced pressure in the slot at a point of the termination of the openings into the slot.

4. The apparatus according to claim 1, wherein the plurality of openings in the bush are disposed such that they terminate in a center region of the slot.

5. The apparatus according to claim 1, wherein the plurality of openings in the bush are radial holes uniformly distributed along the circumference.

6. The apparatus according to claim 1, wherein the flow from the plurality of openings is received from a pressure housing.

7. The apparatus according to claim 1, wherein the plurality of openings lie in a plane perpendicular to a center axis of the shaft.

8. The apparatus according to claim 1, wherein the plurality of openings are disposed at an axial distance from one another in a plurality of planes that are perpendicular to a center axis of the shaft.

9. The apparatus according to claim 2, wherein a centrifugal pump is connected to said shaft.

10. The apparatus according to claim 9, wherein said centrifugal pump is disposed at a 200 m transport height.

11. The apparatus according to claim 1, wherein the flow from the plurality of openings is received from a pressure connection piece of a turbo-machine.

12. The apparatus according to claim 1, wherein fluid at said third pressure enters said plurality of openings, and flows from said plurality of openings into said slot.

* * * * *